(12) United States Patent
Memmott et al.

(10) Patent No.: US 10,116,526 B2
(45) Date of Patent: Oct. 30, 2018

(54) SYSTEMS AND METHODS FOR PROVIDING A SELF-ELECTING SERVICE

(71) Applicant: Ivanti, Inc., South Jordan, UT (US)

(72) Inventors: James Lester Memmott, Draper, UT (US); Gregory Paul Olsen, Lindon, UT (US); Scot Emery Swan, Mapleton, UT (US); Mitchell Jay Edgar, Eagle Mountain, UT (US); Rex Michael McMillan, South Jordan, UT (US)

(73) Assignee: Ivanti, Inc., South Jordan, UT (US)

( * ) Notice: Subject to any disclaimer, the term of this patent is extended or adjusted under 35 U.S.C. 154(b) by 174 days.

(21) Appl. No.: 15/154,733

(22) Filed: May 13, 2016

(65) Prior Publication Data
US 2017/0331708 A1  Nov. 16, 2017

(51) Int. Cl.
*G06F 15/173* (2006.01)
*H04L 12/24* (2006.01)

(52) U.S. Cl.
CPC .......... *H04L 41/5054* (2013.01); *H04L 41/12* (2013.01)

(58) Field of Classification Search
CPC ........................... H04L 41/5054; H04L 41/12
See application file for complete search history.

(56) References Cited

U.S. PATENT DOCUMENTS

| | | | |
|---|---|---|---|
| 7,035,918 B1 * | 4/2006 | Redding | G06F 21/105 370/352 |
| 7,046,666 B1 | 5/2006 | Bollay et al. | |
| 9,137,780 B1 | 9/2015 | Olsen et al. | |
| 2003/0037331 A1 | 2/2003 | Lee | |
| 2004/0107242 A1 | 6/2004 | Vert et al. | |
| 2004/0186897 A1 * | 9/2004 | Knauerhase | H04L 67/16 709/209 |
| 2005/0198359 A1 * | 9/2005 | Basani | H04L 67/1095 709/232 |
| 2006/0018333 A1 | 1/2006 | Windisch et al. | |
| 2006/0072572 A1 | 4/2006 | Ikeda et al. | |
| 2006/0265709 A1 | 11/2006 | Meaney | |
| 2007/0116014 A1 | 5/2007 | Shuen et al. | |
| 2007/0118614 A1 | 5/2007 | Bertin | |
| 2007/0140213 A1 | 6/2007 | Milligan et al. | |
| 2007/0156898 A1 | 7/2007 | Appleby et al. | |
| 2007/0177513 A1 | 8/2007 | Kuokkanen | |
| 2008/0247396 A1 | 10/2008 | Hazard | |
| 2009/0070579 A1 | 3/2009 | Murakami et al. | |

(Continued)

FOREIGN PATENT DOCUMENTS

WO  WO 2017/197258  11/2017

OTHER PUBLICATIONS

Office Action for U.S. Appl. No. 14/061,015, dated Sep. 1, 2017, 21 pages.

(Continued)

*Primary Examiner* — Tonia L Dollinger
*Assistant Examiner* — Steven C Nguyen

(57) ABSTRACT

A method for a self-electing service by a managed device is described. The method includes configuring the managed device with a service. The service is configured on at least one additional managed device in a network segment. The method also includes determining whether the managed device is selected to provide the service by negotiating with the at least one additional managed device in the network segment based on preconfigured election rules.

23 Claims, 9 Drawing Sheets

(56) References Cited

U.S. PATENT DOCUMENTS

| | | |
|---|---|---|
| 2010/0088425 A1 | 4/2010 | Hooda et al. |
| 2011/0019673 A1 | 1/2011 | Fernandez Gutierrez |
| 2011/0164508 A1 | 7/2011 | Arai et al. |
| 2012/0271895 A1* | 10/2012 | Maenpaa et al. ....... H04L 12/18 709/206 |
| 2014/0010141 A1 | 1/2014 | Kim et al. |

OTHER PUBLICATIONS

Office Action for U.S. Appl. No. 14/061,015, dated Jan. 26, 2017, 17 pages.
Office Action for U.S. Appl. No. 14/061,015, dated Aug. 9, 2016, 16 pages.
Office Action for U.S. Appl. No. 14/061,015, dated Mar. 16, 2016, 15 pages.
Office Action for U.S. Appl. No. 14/061,015, dated Sep. 22, 2015, 18 pages.
Office Action for U.S. Appl. No. 14/583,531, dated Sep. 11, 2017, 11 pages.
International Search Report and Written Opinion for International Application No. PCT/US2017/032396, dated Aug. 1, 2017, 7 pages.
Office Action for U.S. Appl. No. 14/583,531, dated Mar. 30, 2018, 16 pages.

* cited by examiner

SYSTEMS AND METHODS FOR PROVIDING A SELF-ELECTING SERVICE

TECHNICAL FIELD

The present disclosure generally relates to computers and computer-related technology. More specifically, the present disclosure relates to systems and methods for providing a self-electing service between peer computing devices on a network.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with networks is providing services. One or more computing devices in a network may be configured to provide a service in a network segment. Traditionally, a network administrator must configure each of these computing devices individually for this task. However, this may be burdensome for an administrator. Furthermore, problems may occur when services are duplicated or when a computing device providing a service fails or goes offline. As can be observed from this discussion, systems and methods that provide self-electing service between peer computing devices on a network may be beneficial to the operation and management of a computer network.

DETAILED DESCRIPTION

Figure 1:
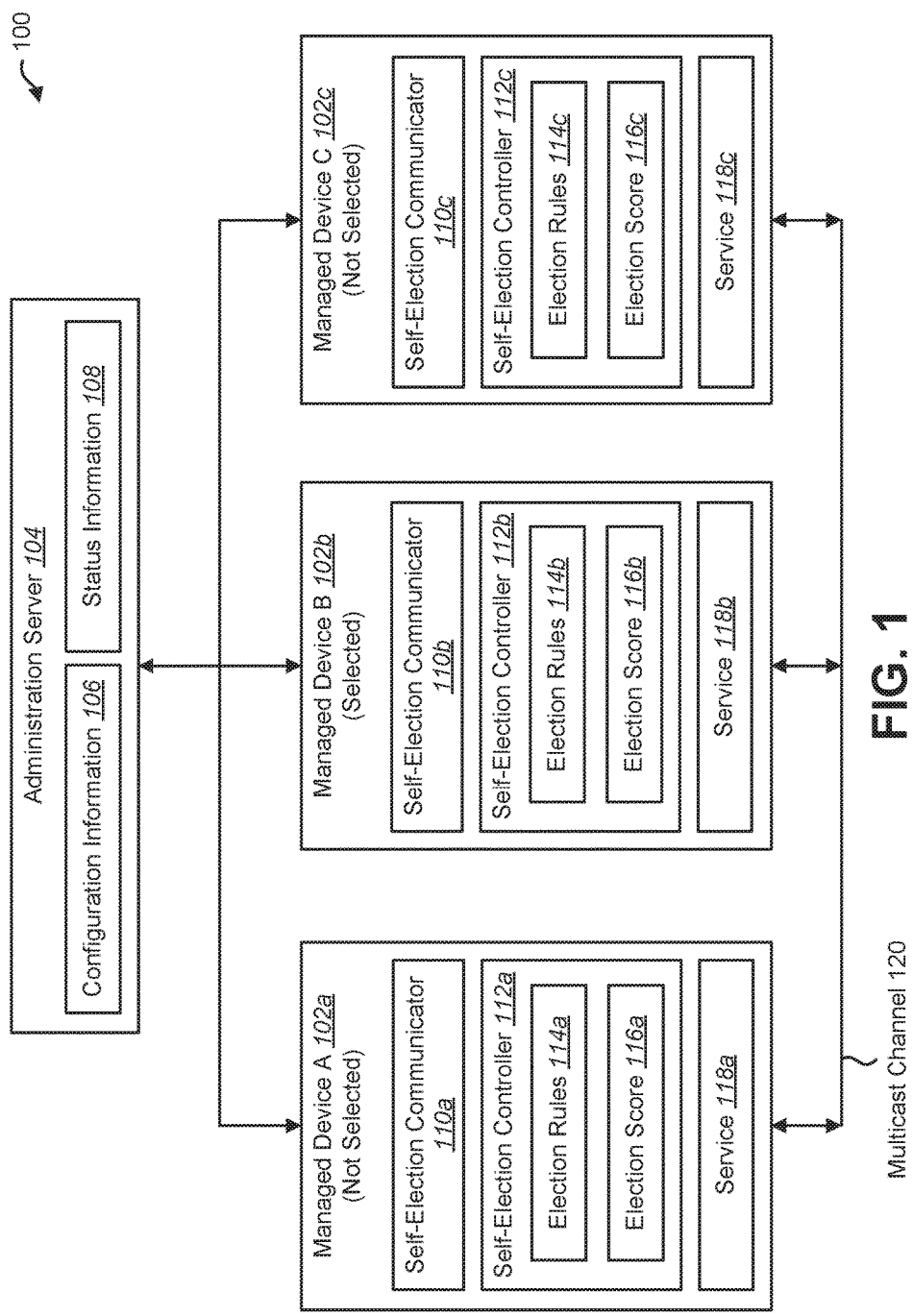
FIG. 1 is a block diagram illustrating one configuration of a network for providing a self-electing service.

A method for a self-electing service by a managed device is described. The method includes configuring the managed device with a service. The service is configured on at least one additional managed device in a network segment. The method also includes determining whether the managed device is selected to provide the service by negotiating with the at least one additional managed device in the network segment based on preconfigured election rules.

Determining whether the managed device is to provide the service may include determining an election score for the managed device based on criteria indicated by the preconfigured election rules. The election score of the managed device may be compared with an election score of at least one additional managed device. The managed device may be selected to provide the service when the election score of the managed device is greater by a threshold amount than the election score of the at least one additional managed device. The election score indicates how good of a candidate the managed device is to provide the service.

The preconfigured election rules may be provided to each managed device in the network segment. Each managed device may determine its own election score using the preconfigured election rules. The election score of the managed device and the election score of the at least one additional managed device may be communicated to each other in multicast messages sent on the network segment.

When the managed device is selected to provide the service, the method also includes sending a periodic message on a multicast channel. The periodic message may indicate that the managed device is selected to provide the service. The periodic message may also include an election score of the managed device. The at least one additional managed device may allow the managed device to provide the service upon receiving the periodic message.

The method may also include sending an inquiry message on a multicast channel when the managed device joins the network segment. The inquiry message may indicate that the managed device can provide the service and inquires whether another managed device in the network segment is providing the service.

The method may also include receiving an inquiry response from a second managed device. The inquiry response may indicate that the second managed device is selected to provide the service. The inquiry response may also include an election score for the second managed device. The method may further include determining whether the managed device is selected to provide the service instead of the second managed device by comparing the election score of the second managed device to the election score of the managed device.

When the managed device is selected to provide the service, the method may also include receiving an inquiry message on a multicast channel from a second managed device. The inquiry message may inquire whether the service is being provided. The method may further include sending an inquiry response message on the multicast channel indicating that the managed device is selected to provide the service, the inquiry response message including an election score for the managed device.

When a previously selected managed device goes offline or stops providing the service, the remaining managed devices may negotiate who will provide the service based on the preconfigured election rules.

Messages exchanged during the negotiation may include a cryptographic signature from an originator so that a recipient can validate the messages. If the cryptographic signature for a message does not match, the message may be discarded.

When the managed device is selected to provide the service, the method may also include reporting to an administration server that the managed device is selected to provide the service. The method may further include receiving an instruction from the administration server indicating whether the managed device should start the service. The method may also include sending a status report to the administration server indicating a status of the service.

A managed device configured for a self-electing service is also described. The managed device includes a processor, memory in electronic communication with the processor and instructions stored in the memory. The instructions are executable to configure the managed device with a service. The service is configured on at least one additional managed device in a network segment. The instructions are also executable to determine whether the managed device is selected to provide the service by negotiating with the at least one additional managed device in the network segment based on preconfigured election rules.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a network 100 for providing a self-electing service 118. The network 100 may include multiple managed devices 102a-c. Examples of managed devices 102a-c include desktop computers, laptop computers, tablet computers, servers, cellular phones, smartphones, routers, gaming systems, etc. The network 100 may include one or more Local Area Networks (LANs), Wide Area Networks (WANs), Wireless Local Area Networks (WLANs), the Internet, etc.

In the area of computer management it is, at times, needful to have one or more devices provide a specific service 118 (or set of services 118) on a network segment. In an implementation, a network segment may be a subnetwork (also referred to as a subnet) subdivision of an internet protocol (IP) network. The network segment may be connected to a larger network via routers and switches.

A service 118 is any kind of process that provides some kind of service. Examples of a service 118 that may be provided by a managed device 102 include, but are not limited to, pre-boot services (e.g., preboot execution environment (PXE) services), device discovery services and media streaming services (e.g., universal plug and play (UPnP)). A service 118 could be a Windows service, Linux/Unix daemon, standard process, or could even be a service within a given process that can be enabled and disabled.

A network segment may include a plurality of managed devices 102. In an implementation, a managed device 102 is a computing device configured to communicate with and receive instruction from an administration server 104. The administration server 104 may be located in the same network segment as the managed devices 102 or the administration server 104 may be located in another network location. For example, a managed device 102 may communicate with the administration server 104 over an intranet or an extranet via the transmission control protocol/internet protocol (TCP/IP).

In an implementation, a managed device 102 may include an agent module that implements administrative and/or management processes within a network segment. The agent module may also communicate with the administration server 104. For example, a managed device 102 may be configured to detect unmanaged devices that access the network segment and report the unmanaged devices to the administration server 104.

In current network operation, an administrator must install the services 118 on one managed device 102 in each subnet. It is difficult for an administrator to have a special configuration that must be installed on just one computer on each subnet. In other words, having a separate configuration that includes the install of the service 118 and finding the group of managed devices 102 (one on each subnet) is a challenge. This is a time consuming process that requires the administrator to know which managed device(s) 102 are to receive the service 118 and which managed device(s) 102 are to provide the service 118 and which managed device(s) 102 are not to provide the service 118. This problem is compounded in a network 100 that includes multiple network segments, each having one or more managed devices 102 providing the service 118 in a given network segment.

Currently, it is a network administrator's responsibility to know which managed device 102 a service 118 is installed on, and then to deal with one configuration for the install package that has the service 118 feature enabled, and another one that does not have the service 118 enabled. Furthermore, the administrator must then deploy those various configurations to the appropriate managed devices 102. In other words, a system administrator has to create different client configurations, some with the desired service 118 and others without. The administrator also has to decide on which machines to install the configuration with services 118 and on which to install the one without services 118. As seen by this discussion, it is desirable for an administrator to not want to have to configure each managed device 102 specifically to provide a service 118 or not.

At some point in time, a managed device 102 that is providing a service 118 may go offline (e.g., turned off). This may be inadvertent or purposeful. Then, the service 118 that the administrator assumed was being provided on that network segment would no longer be provided. Now, no managed device 102 is providing that service 118. In this case, the network segment would be starved of the intended service 118. When a service 118 or managed device 102 goes down, there is no mechanism to allow another managed device 102 to take over without intervention from the administrator.

In addition, the opposite problem may occur when multiple managed devices 102 provide redundant services 118. For example, an administrator may accidently install an agent package to have a service 118 enabled on all managed devices 102. These managed devices 102 may start to flood the administration server 104 with more information than is needful. This is an inefficient use of network resources. It is desirable that multiple systems are capable of providing services 118 but only one managed device 102 may be necessary at any given time per network segment.

The systems and methods described herein provide client self-electing services 118 between peer managed devices 102 on a network 100. These approaches provide for service 118 failover and eliminate service 118 duplication. Multiple managed devices 102 may be configured to provide a service 118 but once installed only one managed device 102, or a limited number of managed devices 102, would provide the service 118.

Multiple managed devices 102 in a network segment may be configured in a similar fashion such that any of them could provide a given service 118. In the example shown in FIG. 1, three managed devices 102 are configured to be able to provide the same service 118. Managed device A 102a, managed device B 102b and managed device C 102c are each configured to provide the same service 118. It should be noted that this example describes a single service 118. However, the multiple managed devices 102 may be configured to provide multiple services 118. While three managed devices 102 are shown, it should be recognized that more or fewer managed devices 102 may be included in a given network segment.

The managed devices 102a-c may be configured with a self-election communicator 110a-c and a self-election controller 112a-c, respectively. A self-election communicator 110 may communicate with an administration server 104. The self-election communicator 110 may also communicate with other managed devices 102 over a multicast channel 120. A self-election controller 112 may be configured to start and stop various kinds of services 118 on the managed device 102.

An administrator may configure the multiple managed devices 102 with equal capabilities when deployed. Therefore, all managed devices 102 can be configured the same when installed. As described above, currently a unique configuration with that service 118 enabled needs to be created and then a managed device 102 or set of managed devices 102 needs to be selected for the installation separate from the other systems using a standard configuration (where the service 118 was not installed).

In an implementation, a system administrator may configure what managed devices 102 can provide services 118, what services 118 should be provided, and which subnets should have some or any of these services 118. This may be configured at the administration server 104. The configuration information 106 for all managed devices 102 in a managed enterprise may include information such as devices that are eligible to provide a particular service 118, the services 118 that should be provided, and the subnets that each service 118 should be provided on. An administrator is able to change these to meet the business needs of the company or customers.

The administration server 104 may also include status information 108 in which the status from the managed devices 102 is reported to the administration server 104 for reporting and management purposes. This status information 108 can be maintained in files, a database or any other kind of persistent storage.

It should be noted that the systems and methods described herein may be implemented with or without the administration server 104. For example, the managed devices 102 may be configured to receive configuration information 106 from and report status information 108 to the administration server 104. Alternatively, the managed devices 102 may provide a self-electing service 118 without an administration server 104.

The managed devices 102 automatically decide among themselves which managed devices(s) 102 should provide the service 118 in a reliable and trustworthy way. A managed device 102 may determine whether it is selected to provide the service 118 by negotiating with at least one additional managed device 102 in the network segment. This negotiation may be based on preconfigured election rules 114.

The election rules 114 may be provided to each managed device 102 in the network segment. For example, the election rules 114 may be installed on the managed device 102 as part of the self-election controller 112. The election rules 114 may be the same for each managed device 102, thus providing a uniform standard with which to evaluate the suitability of a managed device 102 to provide a service 118. The election rules 114 may include criteria that allow a managed device 102 to determine its election score 116. The election score 116 indicates how good of a candidate a given managed device 102 is for providing a service 118.

The election score system may include various criteria associated with the managed device 102. The criteria may include device type (e.g., desktop vs laptop), processor speed, available hard disk space, and if the managed device 102 is already running the desired service 118 or not. Other criteria may be part of the election rules 114. The election rules 114 may be updated so that criteria can be added, modified or removed.

Each managed device 102 may determine its own election score 116 using the preconfigured election rules 114. A managed device 102 may periodically recalculate its election score 116 to reflect changes in the managed device 102.

A managed device 102 may communicate its election score 116 with other managed devices 102. For example, when a managed device 102 on a network segment comes online, the managed device 102 may broadcast inquiry messages indicating that they are capable of providing a service 118 or set of services 118 of the managed device 102. The self-election communicator 110 may send the inquiry message with the election score 116 of the managed device 102. In an implementation, the messages sent out are cryptographically signed by the originator so that the recipient can validate that they can trust the messages. If the cryptographic signature does not match, the message is discarded. The inquiry message may include an identification (ID) for the given service 118.

The message may be sent on the multicast channel 120. Multicasting refers to a communication technique where a single computing device may send the same data to many (or even all) computing devices on a network segment. The use of multicast messages is more efficient than establishing point-to-point communication where each managed device 102 in a subnet establishes a connection.

Upon receiving the election score 116 of another managed device 102, a given managed device 102 may compare its election score 116 with the election score 116 of the other managed device 102. The managed device 102 with the highest election score 116 wins and is selected to provide the service 118. If there is a tie, a tie breaker algorithm may be used to decide which managed device 102 wins.

In the example shown in FIG. 1, managed device B 102b has a higher election score 116b than managed device A 102a or managed device C 102c. Therefore, managed device B 102b is selected to provide the service 118b. Managed device A 102a and managed device C 102c are not selected to provide the service 118.

In an implementation, if another managed device 102 is currently providing the service 118, then a given managed device 102 is selected to provide the service 118 when the election score 116 of the given managed device 102 is greater by a threshold amount than the election score of the other managed device 102.

Once selected, a managed device 102 may send a message on the multicast channel 120 indicating to the other managed devices 102 that it has been selected to provide the service 118. The selected managed device 102 may include its election score 116 in this message to allow the other managed devices 102 to compare their election scores 116.

The selected managed device 102 may send a periodic heartbeat message on the multicast channel 120 so that all managed devices 102 can tell that the selected managed device 102 providing the service 118 is still running. If the selected managed device 102 stops providing the service 118 or goes offline for some reason, the remaining managed device 102 may negotiate who will provide the service based on the preconfigured election rules 114. For example, the remaining managed devices 102 may start the election process again and exchange election scores 116 to determine which one is selected to provide the service 118.

If a managed device 102 that is providing a service 118 goes offline, another managed device 102 will pick up and provide the service 118 through self-election services, hence, providing dynamic fail-over capabilities. If a managed device 102 comes back online that was providing a service 118, and another managed device 102 has already taken over, they will negotiate such that only one of them will continue to provide the service 118.

In an implementation, once elected, a managed device 102 may check in with the administration server 104 to see if the service 118 (or services 118) should be provided on the network segment the managed device 102 is on. If the service 118 should be enabled on that network segment, the selected managed device 102 may start the service 118. If the service 118 should not be enabled, the selected managed device 102 may continue sending a periodic heartbeat message on the multicast channel 120 indicating that the selected managed device 102 is still selected. However, the selected managed device 102 may not enable the service 118.

In an implementation, the selected managed device 102 only reports to the other managed devices 102 that it has been selected. The selected managed device 102 does not report if it is providing the service or not to the peer managed devices 102. In this implementation, the selected managed device 102 does not publish the fact that the service 118 has been disabled or enable for the subnet the selected managed device 102 is on. In another implementation, the selected managed device 102 may publish this information to the peer managed devices 102.

The status of the service(s) 118 may (optionally) be reported to the administration server 104 on a regular basis so the system administrator knows it is still running. In an implementation, the interval of the status report is configurable so the system administrator can balance the timeliness in which the data is received against the amount of network bandwidth they are willing to allow it to consume. The selected managed device 102 may send status information 108 to the administration server 104. By limiting the status reports to the selected managed device 102, network resources are conserved.

In an implementation, the administration server 104 may include a graphical interface that lists the subnets and the managed devices 102 included in each subnet. This gives an administrator the ability to select from the graphical interface a list of subnets in the network 100. The administrator can go through those subnets in turn. For example, an administrator may or may not want a given service 118 on a given subnet. The administrator may enable or disable the service 118 on the subnet from the administration server 104. This implementation provides granularity at the subnet level. These decisions may be communicated to the managed devices 102 via the configuration information 106.

Furthermore, an administrator could also enable or disable services 118 at the device level. For example, an administrator may not want a service 118 to be provided on the laptop of a particular individual. The administrator may disable the service 118 for that particular laptop, but other managed devices 102 on that subnet would still be able to provide that service 118 there locally.

The graphical interface on the administration server 104 may display the status information 108. For example, the graphical interface may provide the administrator with a list of subnets, which managed devices 102 are selected and how long a service 118 has been running. In this way, an administrator can tell that the system is healthy. The administrator can tell when a given managed device 102 reported in last.

It should be noted that the example described in connection with FIG. 1 is discussed in terms of having just a single managed device 102 provide a service 118. In another example, multiple managed devices 102 may be selected to provide a service 118 based on the election process. For example, two managed devices 102 with the highest election scores 116 may be selected to provide the service 118, and so forth.

The described systems and methods for providing a self-electing service 118 free up the system administrator from having to create different client configurations, where some configurations have the desired service 118 and others do not. This also frees up the administrator from having to decide on which managed devices 102 to install the configuration with services 118 and on which to install the one without services 118. If a service 118 or managed device 102 goes down, automatic fail-over allows another managed device 102 to take over without intervention from the administrator. If at some point in time multiple managed devices 102 provide the service(s) 118 and fewer are desired, the managed devices 102 negotiate among themselves and only one (or a few) will provide the service 118. This may be especially beneficial when a mobile device joins a network segment.

Figure 2:
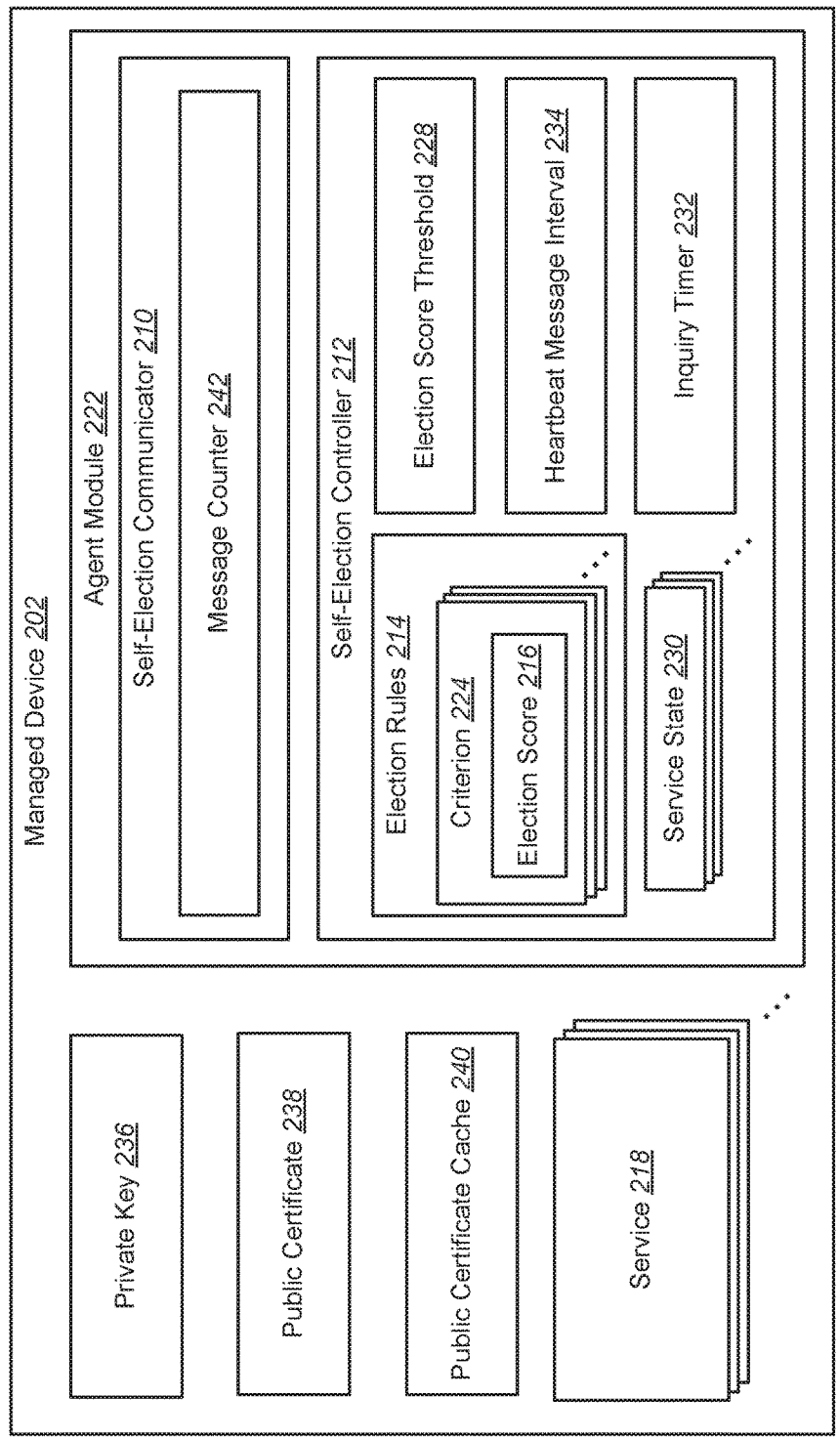
FIG. 2 is a block diagram illustrating a managed device configured to provide a self-electing service.

FIG. 2 is a block diagram illustrating a managed device 202 configured to provide a self-electing service 218. The managed device 202 may be implemented in accordance with the managed devices 102 described in connection with FIG. 1.

The managed device 202 includes an agent module 222. The agent module 222 may be implemented in hardware, software or a combination of hardware and software. The agent module 222 may include a self-election communicator 210 and a self-election controller 212. As described in connection with FIG. 1, the self-election communicator 210 may communicate with other managed devices 202 on a multicast channel 120. The self-election communicator 210 may also communicate with an administration server 104.

The agent module 222 may establish a connection between the administration server 104 and the managed device 202 wherein the administration server 104 has some control over the managed device 202. For example, the agent module 222 may permit the administration server 104 to remotely control operational aspects of the managed device 202. Other examples of functions of the agent module 222 include, but are not limited to, running diagnostic tests on the managed device 202, installing device drivers and/or applications on the managed device 202, scanning for malware on the managed device 202, sending reports to the administration server 104, prohibiting unauthorized use (e.g., prohibit software installations, prohibit browsing) on the managed device 202, relaying information to the administration server 104, managing license usage by the managed device 202, managing power conservation on the managed device 202, directing certain activities (e.g., what software is running) on the managed device 202, and/or perform maintenance and/or repairs to the managed device 202.

Multiple managed devices 202 in a network segment may be configured to provide one or more services 218. Each of the managed devices 202 may be configured with the same agent module 222. Therefore, the managed devices 202 may be equally capable of providing a given service 218. In this example, the managed device 202 is configured with a plurality of services 218. Alternatively, the managed device 202 may be configured with a single service 218.

The managed device 202 may use election rules 214 to negotiate with other managed devices 202 whether it is to provide a service 218. The election rules 214 may include criteria 224 with which a managed device 202 determines an election score 216. The criteria 224 may reflect characteristics of the managed device 202. Each criterion 224 may provide an election score 216 for a given characteristic. These election scores 216 indicate how good of a candidate the managed device 202 is for providing a service 218.

One criterion 224 may be the amount of random access memory (RAM) that the managed device 202 has. A higher election score 216 may be associated with more RAM and a lower election score 216 may be associated with less RAM.

Another criterion 224 may be the processor speed, where a faster processor speed has a higher election score 216 than a lower processor speed. Another criterion 224 may be the amount of available hard disk space. Another criterion 224 may include the device type (e.g., desktop vs laptop).

The election rules 214 may vary depending upon the type of service 218 being provided. For example, if the service 218 is associated with a wired connection (e.g., Ethernet-type connectivity), then a criterion 224 for connectivity may give a higher election score 216 if the managed device 202 has a wired network connection as opposed to a wireless connection. In another example, a service 218 may be related to wireless connectivity. In this case, the criterion 224 for connectivity may give a higher election score 216 if the managed device 202 has a wireless network connection.

Yet another criterion 224 may be whether the managed device 202 is currently selected to provide the service 218. It is beneficial to avoid quickly switching off the service 218 on one managed device 202 and starting the service 218 on another managed device 202. This criterion 224 may have a higher election score 216 when the managed device 202 is currently selected to provide the service. It should be noted that other criteria 224 may be used to determine the election score 216 of a managed device 202.

The managed device 202 may evaluate its own characteristics according to the election rules 214 to determine an election score 216. For example, the managed device 202 may evaluate each criterion 224 to obtain a set of election scores 216. The managed device 202 may sum up the election scores 216 of all of the criteria 224 to determine its overall election score 216. This scoring system enables the managed devices 202 in a network segment to determine which one is most likely, or the best candidate, to provide a service 218.

The managed device 202 may compare its election score 216 with the election score 216 of another managed device 202 to determine who will provide a service 218. In one implementation, the managed device 202 with the highest election score 216 is selected to provide the service 218. In another implementation, the election score 216 of the managed device 202 must be greater by an election score threshold 228 than the election score 216 of another managed device 202 that is currently selected to provide the service 218. The election score threshold 228 may be an amount that the election score 216 of a managed device 202 must exceed to become elected to provide the service 218. In this way, a given managed device 202 must have a sufficiently higher election score 216 before switching the selection.

In an example, a first managed device 202 and a second managed device 202 may be configured to provide a service 218 in a network segment. Also, the election score threshold 228 has a value of "10." In this example, the first managed device 202 is currently selected to provide the service 218. Also, the first managed device 202 has an election score of 150.

In one scenario, the second managed device 202 has an election score of 140. In this case, the first managed device 202 has the higher election score and continues to be selected to provide the service 218.

In another scenario, the second managed device 202 has an election score of 152. Even though the second managed device 202 has a higher election score, the difference between the two election scores (i.e., 152-150=2) is less than the election score threshold 228 of 10. Therefore, the first managed device 202 continues to be selected to provide the service 218.

In yet another scenario, the second managed device 202 has an election score of 160. In this case, the election score 216 of the second managed device 202 is greater than the election score 216 and an election score threshold 228 and the second managed device 202 is selected to provide the service 218. At this point both the first managed device 202 and the second managed device 202 realize that the first managed device 202 should step down and let the second managed device 202 provide the service 218.

In the event that two or more managed devices 202 have the same election score 216, the managed devices 202 may employ a tiebreaker algorithm. In an implementation, a managed device 202 may create a random ID. This may be a Global Unique ID (GUID). When a tie occurs, the managed devices 202 may compare their GUIDs to each other. Whichever managed device 202 has the highest GUID or lowest GUID will be the winner of that election. Since they are global unique, one managed device 202 is guaranteed to be higher or lower than all the others, in which case it would then be selected.

In an implementation, the managed device 202 may keep track of a service state 230 for a given service 218. While the managed device 202 is in operation, the self-election controller 212 may keep track of the service state 230 on the different services 218. The service state 230 may indicate whether a given service 218 is active and which managed device 202 is providing the service 218. The service state 230 information may be stored in memory. When a managed device 202 comes online in a network segment (e.g., powers on or joins a network segment), the managed device 202 has no knowledge of the service state 230.

The self-election communicator 210 may send out an inquiry message with the ID for a service 218 on the multicast channel 120. Other managed devices 202 in the network segment may be listening. If another managed device 202 is already elected, then that managed device 202 will respond with an inquiry response that includes the election score 216 of that managed device 202.

If a managed device 202 sends out an inquiry message and no other managed device 202 replies, then the inquiring managed device 202 may assume that it is the only one on the network segment, and no other managed device 202 is selected to provide the service 218. In this case, the managed device 202 may become self-selected to provide the service 218.

Once a managed device 202 is selected to provide a service 218, the selected managed device 202 may send out a periodic heartbeat message. The heartbeat message may be sent out after a heartbeat message interval 234, which is a configurable amount of time. The heartbeat message may be sent on the multicast channel 120. The heartbeat message may indicate that the managed device 202 is still selected to provide the service 218.

The managed device 202 may include an inquiry timer 232. The managed device 202 may send an inquiry message on the multicast channel 120 upon expiration of the inquiry timer 232. The inquiry message may indicate that the managed device 202 can provide the service 218 and may inquire whether another managed device 202 in the network segment is providing the service 218. The self-election controller 212 may reset the inquiry timer 232 upon receipt of a heartbeat message, an inquiry response or other message from another managed device 202 that is selected to provide the service 218.

In an implementation, the managed device 202 may implement security features to ensure the authenticity of messages exchanged on the multicast channel 120. The multicast channel 120 is inherently an open broadcast channel, so anybody who is able to listen in on the multicast channel 120 will be able to see all the traffic that is going back and forth.

A malicious device could potentially add its own messages to the multicast channel 120. The malicious device could even misrepresent where that message came from. It could potentially insert messages making it appear to come from a managed device 202 that was selected before, or some other device.

To guard against this, each managed device 202 in a network segment, when they get installed, may be configured with a cryptographic chain of trust between them. Each managed device 202 may create a private key 236. The managed device 202 may then create a certificate signage request (CSR), and that CSR goes on up to a management server who then signs it, and sends back a public certificate 238 (e.g., a CRT file or certificate file).

If all managed devices 202 have been signed by the same certificate, or the same management server, then they will inherently trust each other. In one approach, when a managed device 202 sends out a message on the multicast channel 120, then the managed device 202 will broadcast their public certificate 238 first. The other managed devices 202 will catch those public certificates 238 and if a public certificate 238 has been signed by the trusted management server, then it will keep a copy of them in a public certificate cache 240. When a message is received, that message may then be checked against the public certificate 238 that was received. If it passes a cryptographic check (e.g., the message is verified that it was signed by the managed device 202 that sent it), then the managed device 202 may trust it. In this case, the message could have only been sent by the managed device 202 that had that private key 236.

If a new managed device 202 comes online, it may start to see messages from other managed devices 202. If the new managed device 202 does not have the public certificates 238 of the other managed devices 202, the new managed device 202 may send a request to the other managed devices 202 for their public certificates 238. The new managed device 202 may store the received public certificates 238 in its public certificate cache 240. The new managed device 202 can then start validating any messages that come in.

In an implementation, the messages may not be encrypted. However, the messages may be signed to ensure that no other device could generate a message that looks like it came from a valid managed device 202 and also to ensure that a message was not tampered with.

Another concern is replay attacks. In this case, a malicious device could record a message from a valid sender on the network and then hold onto it. Then, at the right time, the malicious device could rebroadcast the message back onto the network, and all those who are listening cannot tell whether it came from a valid managed device 202 or not.

To address a replay attack, the self-election communicator 210 may maintain a message counter 242. This may be a 64-bit incrementing counter. Every time a new message is sent by the managed device 202, the message counter 242 goes up by one. The managed device 202 may include the count number of the message counter 242 in messages that are sent out. Upon receiving a message from another managed device 202, the receiving managed device 202 may determine whether the count number of the message is within a tolerance level. If a message is outside the tolerance level, then the message is disregarded.

In an example, a listening managed device 202 may see a packet (e.g., command message) coming from a sending managed device 202, where the packet has count number of 1,000. Then the listening managed device 202 suddenly sees a message with a count number of 501. The listening managed device 202 would immediately discard the second message, because it would realize that the second message must be very old, because the count value on it is not reasonable. Because multicast traffic can get packets out of order, it could be possible that to receive messages with a count number 10, and then 9, and then 11. These count numbers are relatively close to each other in number and sequence, therefore these messages would be within the tolerance level and considered valid.

It should be noted that using a date and/or time may be problematic for validating a message. There is no good point of reference for date and time. A managed device 202 could be incorrectly set as to date and time. Therefore, the message counter 242 methodology avoids problems with misconfiguration of date and time.

Figure 3:
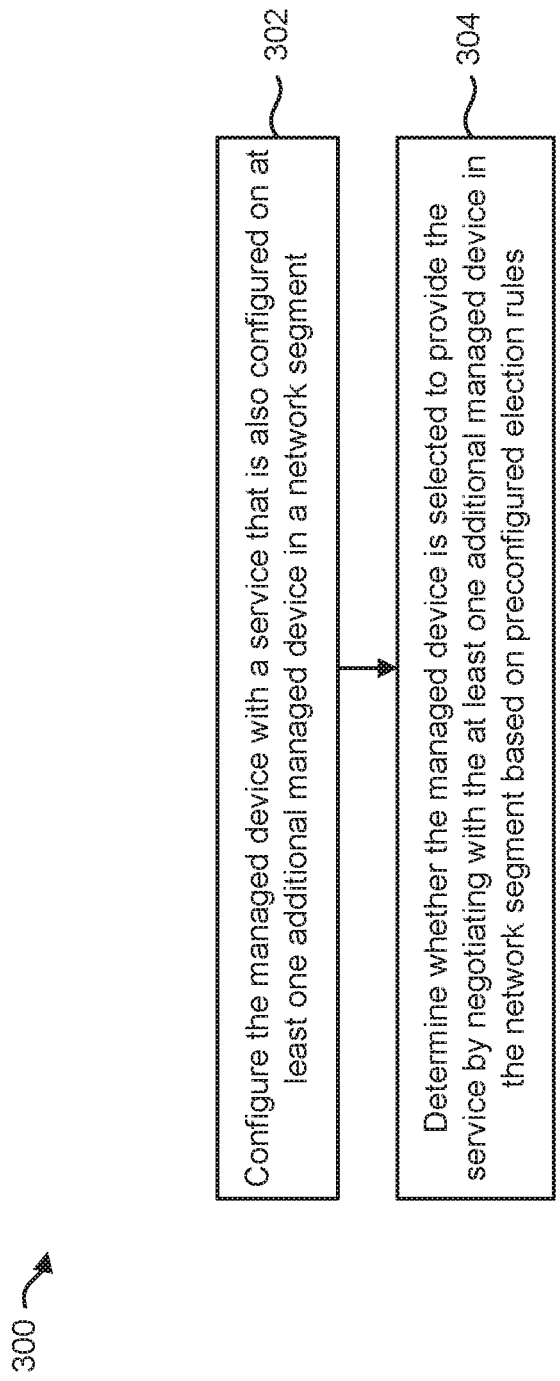
FIG. 3 is a flow diagram illustrating a method for providing a self-electing service.

FIG. 3 is a flow diagram illustrating a method 300 for providing a self-electing service 118. The method 300 may be performed by a managed device 102. The managed device 102 may be part of a network segment (e.g., a subnet).

The managed device 102 may be configured 302 with a service 118. The service 118 may be configured 302 on at least one additional managed device 102 in the network segment.

The managed device 102 may determine 304 whether it is selected to provide the service 118 by negotiating with the at least one additional managed device 102 in the network segment based on preconfigured election rules 114. In an implementation, determining 304 whether the managed device 102 is to provide the service 118 may include determining an election score 116 for the managed device 102 based on criteria 224 indicated by the preconfigured election rules 114. The managed device 102 may determine election scores 216 for one or more criteria 224 associated with the managed device 102 using the preconfigured election rules 114. The election scores 216 indicate how good of a candidate the managed device 102 is to provide the service 118.

The managed device 102 may compare its election score 116 with an election score 116 of at least one additional managed device 102. The election score 116 of the managed device 102 and the election score 116 of the additional managed device(s) 102 are communicated to each other in multicast messages sent on a multicast channel 120 of the network segment. The messages exchanged during the negotiation may include a cryptographic signature from the originator so that a recipient can validate the messages. If the cryptographic signature for a message does not match, the message is discarded.

The managed device 102 may be selected to provide the service 118 when its election score 116 is greater by a threshold amount than the election score 116 of the additional managed device(s) 102. For example, if the difference between the election score 116 of the managed device 102 is greater by an election score threshold 228 amount than the election score 116 of a currently selected managed device 102, then the managed device 102 is now selected to provide the service 118.

Figure 4:
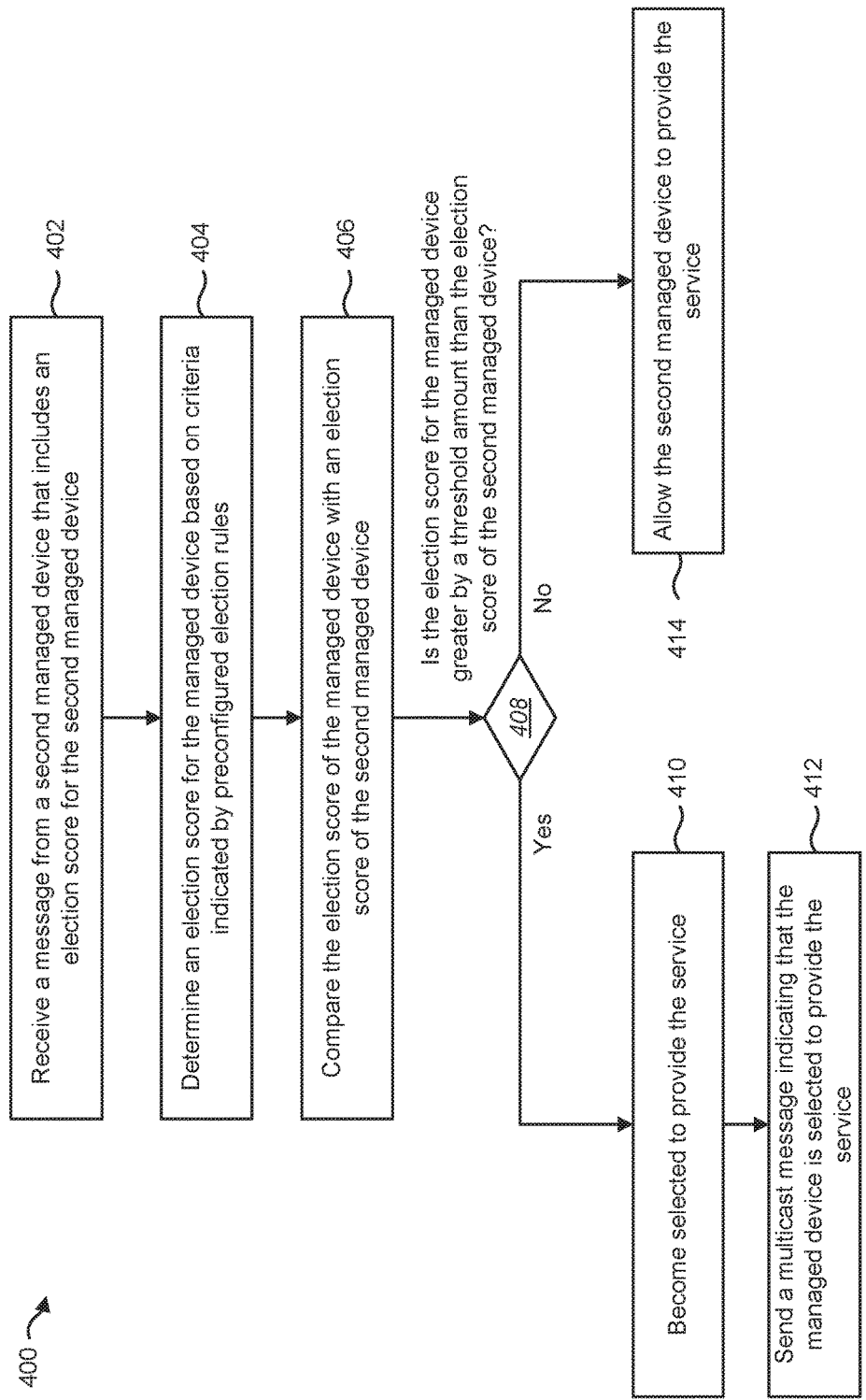
FIG. 4 is a flow diagram illustrating another configuration of a method for providing a self-electing service.

FIG. 4 is a flow diagram illustrating another configuration of a method 400 for providing a self-electing service 118. The method 400 may be performed by a managed device 102. The managed device 102 may be part of a network segment (e.g., a subnet). The managed device 102 may be configured with a service 118. The service 118 may be configured on at least one additional managed device 102 in the network segment. In this example, a second managed device 102 is also configured to provide the service 118 on the network segment.

The managed device 102 may receive 402 a message from the second managed device 102. For example, the second managed device 102 may send an inquiry message upon joining the network segment. Alternatively, the second managed device 102 may send a periodic heartbeat message when it is currently selected to provide the service 118. The message may be received 402 on a multicast channel 120.

The message may include an election score 116 for the second managed device 102. The second managed device 102 may compute its election score 116 using election rules 114 that are provided to both the managed device 102 and the second managed device 102.

The managed device 102 may determine 404 its election score 116 based on criteria 224 indicated by the preconfigured election rules 114. For example, the election rules 114 may include one or more criteria 224 associated with the managed device 102. The managed device 102 may determine an election score 116 for each criterion 224. If multiple criteria 224 are considered, the managed device 102 may add the election scores 116 to obtain its overall election score 116. It should be noted that the managed device 102 may determine 404 its election score 116 either before or after receiving (step 402) the message from the second managed device 102.

The managed device 102 may compare 406 its election score 116 with the election score 116 of the second managed device 102. If the managed device 102 determines 408 that its election score 116 is greater by a threshold amount (e.g., election score threshold 228), then the managed device 102 may become 410 selected to provide the service 118.

The managed device 102 may send 412 a multicast message indicating that it is selected to provide the service 118. This message may include the election score 116 of the managed device 102 so that other managed devices 102 in the network segment may compare their election scores 116 to verify that the selected managed device 102 has the highest election score 116.

The managed device 102 may periodically send a message (e.g., heartbeat message) on the multicast channel 120. This periodic message may indicate that the managed device 102 is selected to provide the service 118. The periodic message may also include the election score 116 of the managed device 102. The additional managed device(s) 102 may allow the managed device 102 to provide the service 118 upon receiving the periodic message. In other words, the other managed device(s) 102 in the network segment may receive the periodic message, recognize that the selected managed device 102 has the highest score and permit the selected managed device 102 to continue acting as the selected provider of the service 118.

In an optional implementation, the managed device 102 may report to an administration server 104 when it is selected to provide the service 118. The managed device 102 may receive an instruction from the administration server 104 indicating whether the managed device 102 should start the service. The managed device 102 may periodically send a status report to the administration server 104 indicating the status of the service 118.

If the managed device 102 determines 408 that that its election score 116 is not greater by a threshold amount (e.g., election score threshold 228), then the managed device 102 may allow 414 the second managed device 102 to provide the service 118. If the second managed device 102 is currently selected to provide the service 118, then the managed device 102 may permit the second managed device 102 to continue as the selected service 118 provider. If the managed device 102 is currently the selected service 118 provider, then the managed device 102 may step down and allow 414 the second managed device 102 to provide the service 118.

Figure 5:
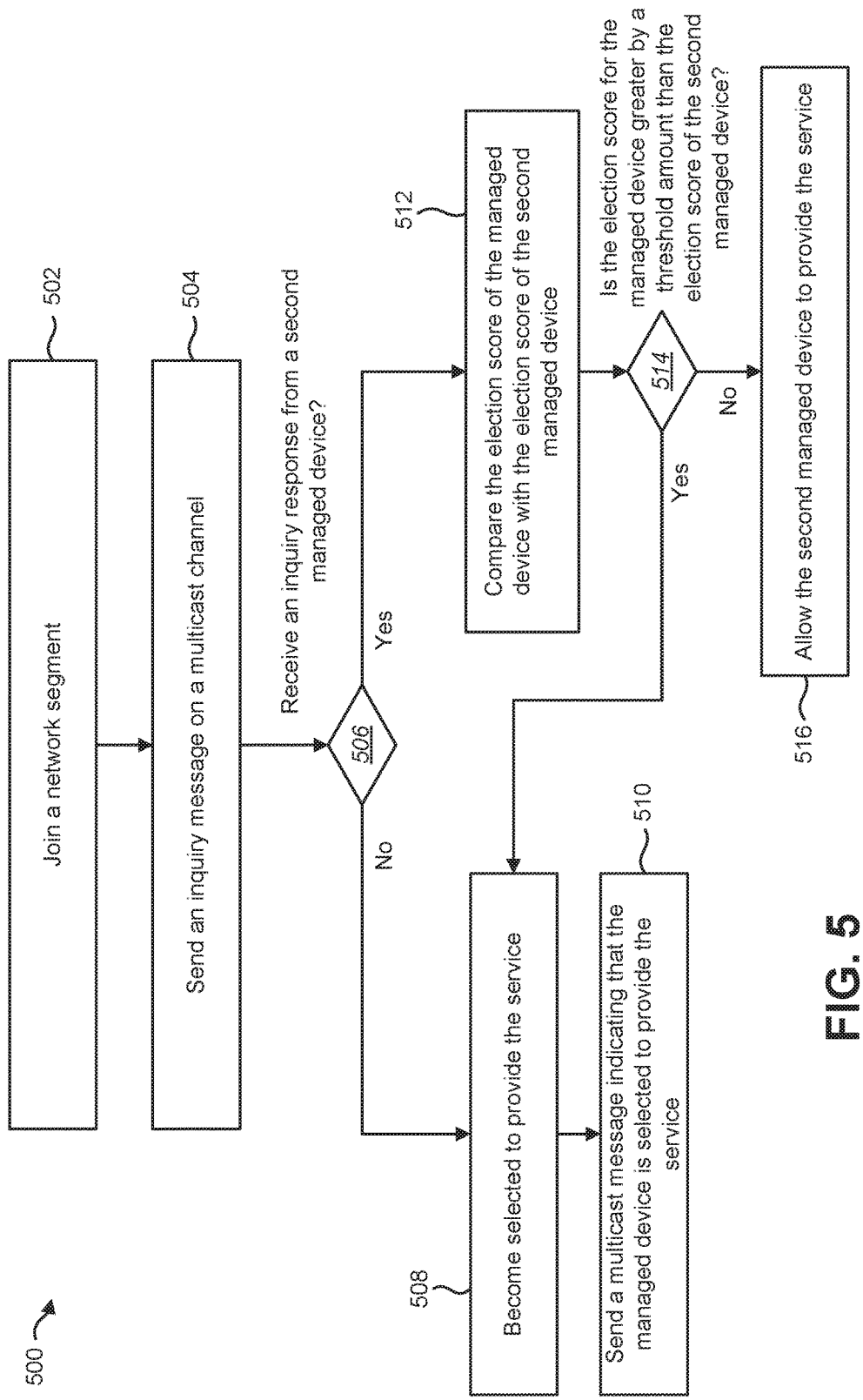
FIG. 5 is a flow diagram illustrating yet another configuration of a method for providing a self-electing service.

FIG. 5 is a flow diagram illustrating yet another configuration of a method 500 for providing a self-electing service 118. The method 500 may be performed by a managed device 102. The managed device 102 may join 502 a network segment (e.g., a subnet). For example, the managed device 102 may power on or may be a mobile device that joins the network segment.

The managed device 102 may be configured with a service 118. The service 118 may be configured on at least one additional managed device 102 in the network segment.

The managed device 102 may send 504 an inquiry message on a multicast channel 120 of the network segment. The inquiry message may indicate that the managed device 102 can provide the service 118. The inquiry message may also inquire whether another managed device 102 in the network segment is providing the service 118.

The managed device 102 may determine 506 whether an inquiry response was received from a second managed device 102. If no inquiry response is received, this indicates that the managed device 102 is the first device to join the network segment. If no inquiry response is received, then the managed device 102 may become 508 selected to provide the service 118.

The managed device 102 may send 510 a multicast message indicating that it is selected to provide the service 118. This may be accomplished as described in connection with FIG. 4.

The managed device 102 may determine 506 that an inquiry response was received. The inquiry response may indicate that the second managed device 102 is selected to provide the service 118. The inquiry response may also include the election score 116 for the second managed device 102.

The managed device 102 may compare 512 its election score 116 with the election score 116 of the second managed device 102. If the managed device 102 determines 514 that its election score 116 is greater by a threshold amount (e.g., election score threshold 228), then the managed device 102 may become 508 selected to provide the service 118. If the managed device 102 determines 514 that its election score 116 is not greater by a threshold amount, then the managed device 102 may allow 516 the second managed device 102 to provide the service 118.

Figure 6:
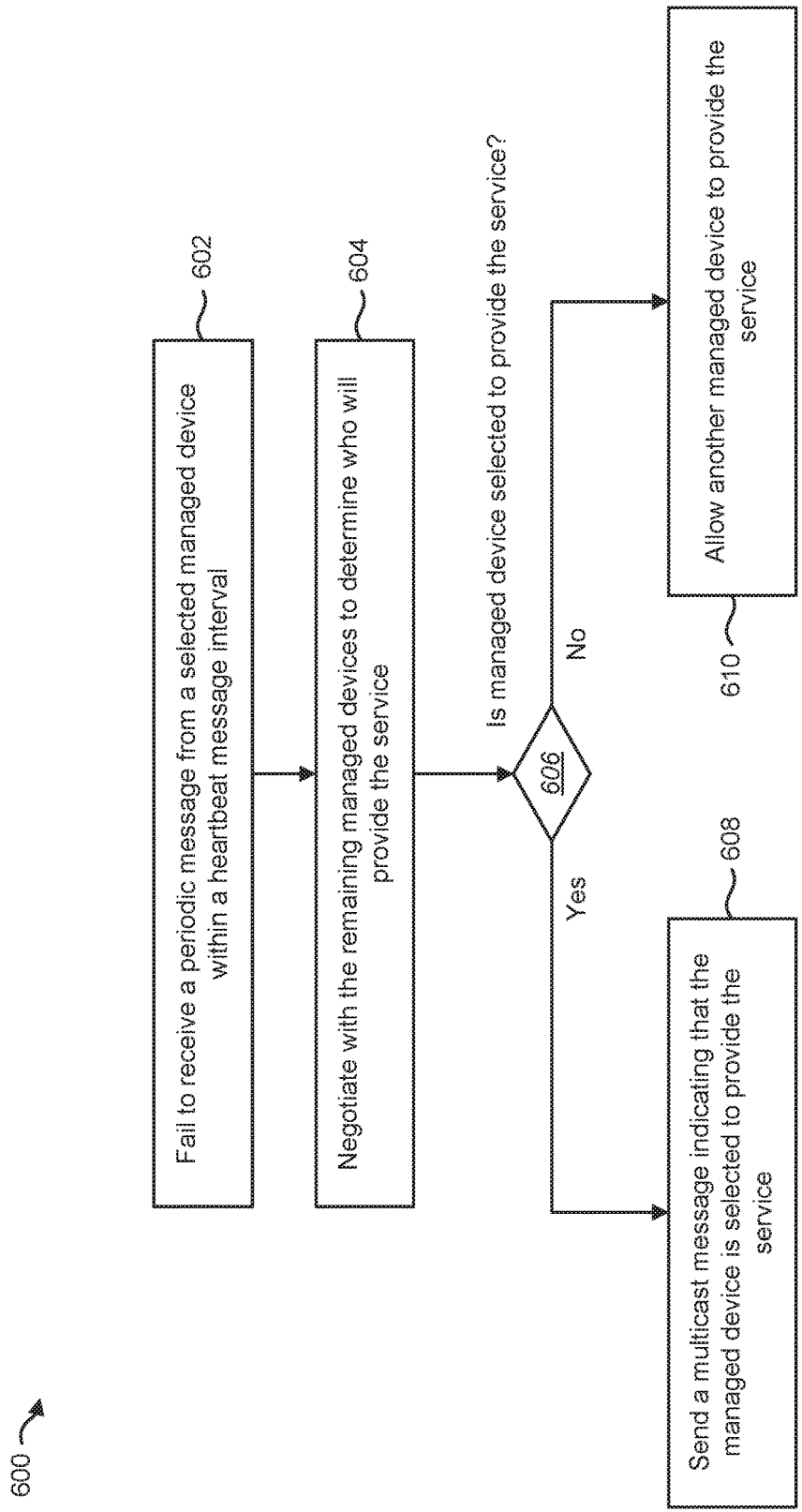
FIG. 6 is a flow diagram illustrating another configuration of a method for providing a self-electing service.

FIG. 6 is a flow diagram illustrating another configuration of a method 600 for providing a self-electing service 118. The method 600 may be performed by a managed device 102. The managed device 102 may be part of a network segment (e.g., a subnet). The managed device 102 may be configured with a service 118. The service 118 may be configured on at least one additional managed device 102 in the network segment. In this example, another managed device 102 is initially selected to provide the service 118 on the network segment.

The managed device 102 may fail 602 to receive a periodic message from the selected managed device 102 within a heartbeat message interval 234. For example, the selected managed device 102 may send a periodic message (e.g., a heartbeat message). At some point, the selected managed device 102 may go offline or stops providing the service 118. At this point, the selected managed device 102 may stop sending the periodic heartbeat message.

The managed device 102 may negotiate 604 with the remaining managed device(s) 102 to determine who will provide the service 118. This negotiation may be based on using preconfigured election rules 114 to determine an election score 116 for the remaining managed device(s) 102, as described in connection with FIG. 1.

If the managed device 102 determines 606 that it is selected to provide the service 118, then the managed device 102 may send 608 a multicast message indicating that it is selected to provide the service 118. This may be accomplished as described in connection with FIG. 4. If the managed device 102 determines 606 that it is not selected to provide the service 118, then the managed device 102 may allow 610 another managed device 102 to provide the service 118.

Figure 7:
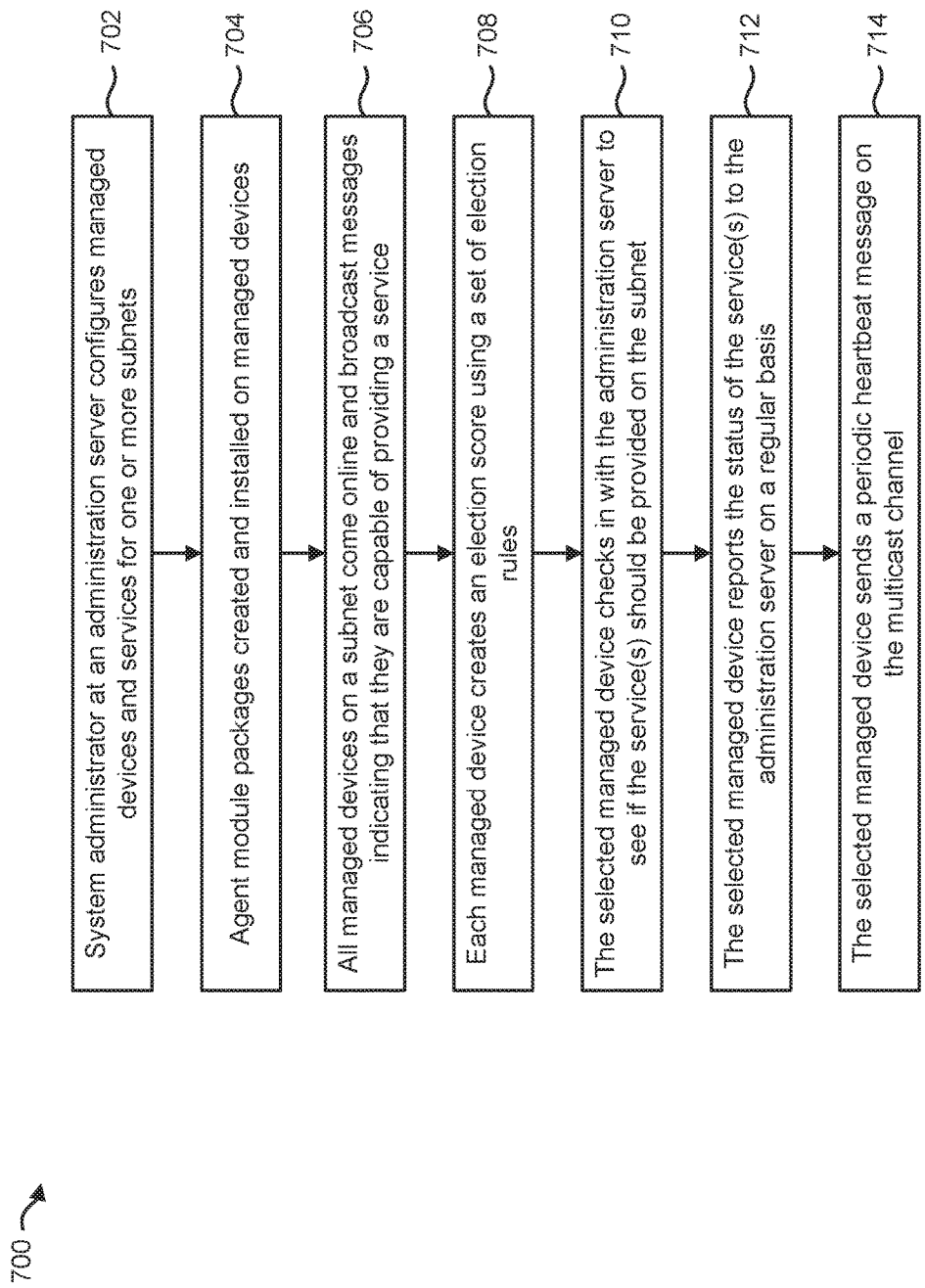
FIG. 7 is a flow diagram illustrating yet another configuration of a method for providing a self-electing service.

FIG. 7 is a flow diagram illustrating yet another configuration of a method 700 for providing a self-electing service 118. In step 702, a system administrator at an administration server 104 may configure what managed devices 102 can provide services 118, what services 118 should be provided, and which subnets should have some or any of these services 118.

In step 704, agent module 222 packages may be created and then installed on managed devices 102 that are all capable of running the desired service(s) 118. The agent module 222 may include client self-election components (e.g., self-election communicator 110 and self-election controller 112).

In step 706, any or all self-election communicators 110 and self-election controllers 112 on a subnet come online and broadcast messages indicating that they are capable of providing a service 118 or set of services 118. The messages may be sent on the multicast channel 120. Messages sent out may be cryptographically signed by the originator so that the recipient can validate that they can trust the messages. If the cryptographic signature does not match, the message is discarded.

In step 708, each managed device 102 creates an election score 116 using a set of election rules 114. The election score 116 determines how good of a candidate a given managed device 102 is for providing each service 118. The managed device 102 with the highest election score 116 wins. If there is a tie, a tie breaker algorithm may be used to decide which managed device 102 wins.

In step 710, once elected, the selected managed device 102 checks in with the administration server 104 to see if the service(s) 118 should be provided on the subnet the managed device 102 is on. If the service 118 should be enabled on that subnet, the selected managed device 102 may enable that service 118.

In step 712, the status of the service(s) 118 is reported to the administration server 104 on a regular basis so the system administrator knows it is still running. The reporting frequency may be configurable. The selected managed device 102 may send status information 108 to the administration server 104.

In step 714, a periodic heartbeat message may be sent on the multicast channel 120 so that all managed devices 102 can tell that the selected managed device 102 providing the service 118 is still running. If the selected managed device 102 stops providing the service 118 or goes offline for some reason, then the remaining managed devices 102 go back to step 708 and start the election process again.

Figure 8:
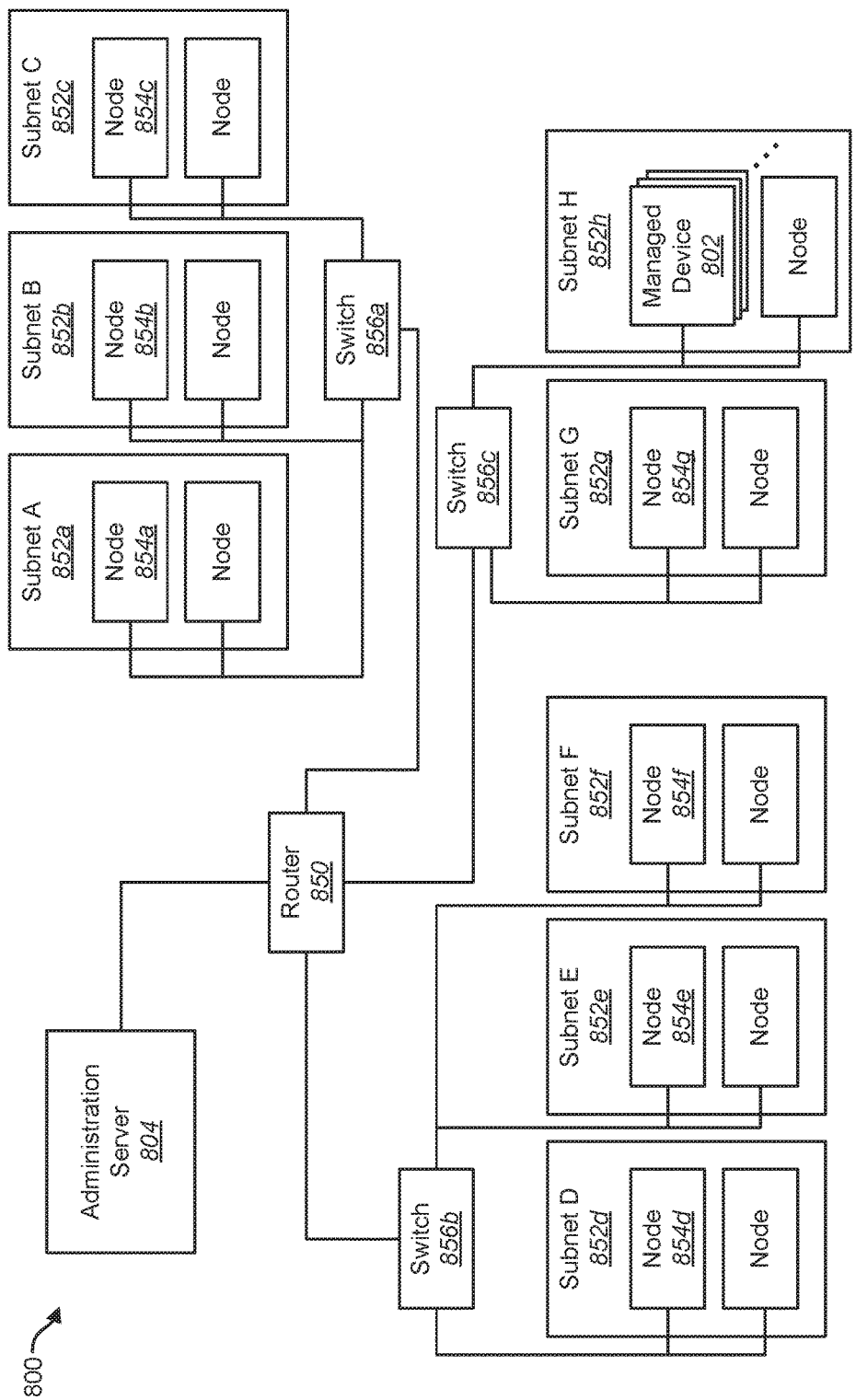
FIG. 8 is a block diagram that illustrates one configuration of a network where systems and methods for providing a self-electing service may be implemented.

FIG. 8 is a block diagram that illustrates one configuration of a network 800 where systems and methods for providing a self-electing service 118 may be implemented. An administration server 804 is connected to a router 850. The router 850 is connected to switches 856a, 856b, and 856c. The switch 856a is connected to several nodes 854a, 854b, 854c, etc., via their respective subnets 852a, 852b, and 852c. The switch 856b is connected to several nodes 854d, 854e, 854f, etc., via their respective subnets 852d, 852e, and 852f. The switch 856c is connected to several nodes 854g, 854h, etc., via their respective subnets 852g and 852h. Subnet H 852h includes one or more managed devices 802.

Although FIG. 8 only shows one router 850, and a limited number of switches 856, subnets 852 and nodes 854, many and varied numbers of routers 850, switches 856, subnets 852 and nodes 854 may be included in networks and/or systems that may implement systems and methods for providing a self-electing service 118.

It should be noted that the administration server 804 may be implemented in accordance with the administration server 104 described in connection with FIG. 1. Furthermore, the managed devices 802 may be examples of one or more of the managed devices 102 and 202 described herein.

Figure 9:
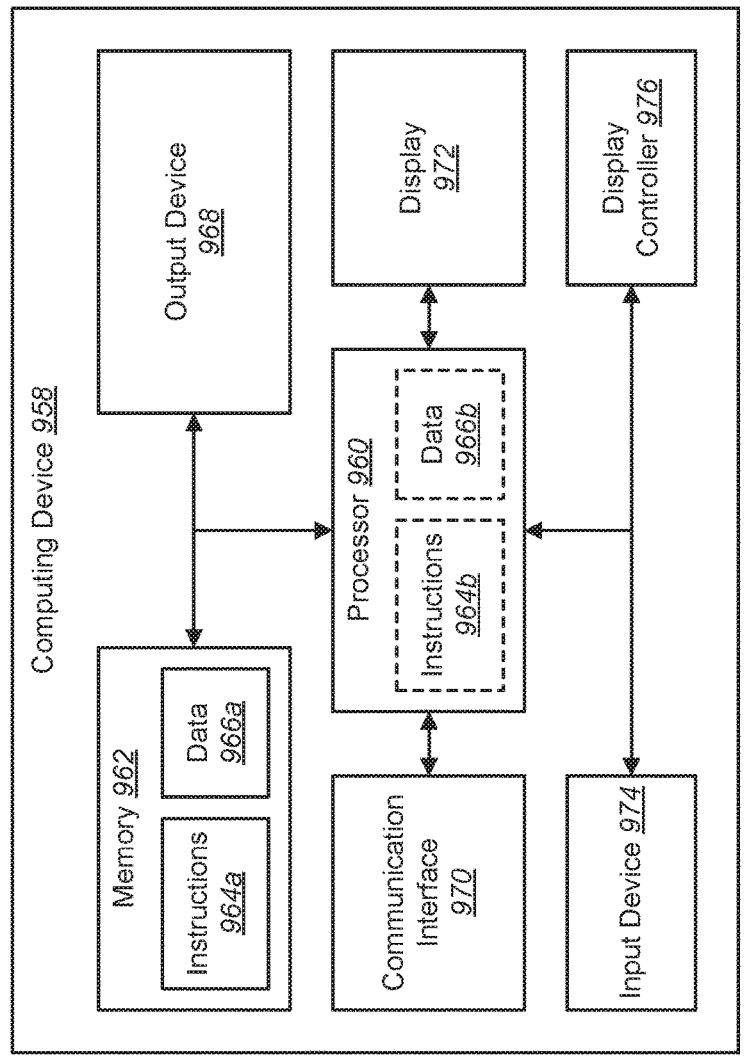
FIG. 9 illustrates various components that may be utilized in a computing device.

FIG. 9 illustrates various components that may be utilized in a computing device 958. The computing device 958 may be configured in accordance with one or more of the managed device 102, 202 and the administration server 104 described herein. The computing device 958 may include a processor 960 and memory 962. The memory 962 may include instructions 964a and data 966a. The processor 960 controls the operation of the computing device 958 and may be, for example, a microprocessor, a microcontroller, a digital signal processor (DSP) or other device known in the art. The processor 960 typically performs logical and arithmetic operations based on program instructions 964b and/or data 966b received from the memory 962.

The computing device 958 typically may include one or more communication interfaces 970 for communicating with other electronic devices. The communication interfaces 970 may be based on wired communication technology, wireless communication technology or both. Examples of different types of communication interfaces 970 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 958 typically may include one or more input devices 974 and one or more output devices 968. Examples of different kinds of input devices 974 include a keyboard, mouse, microphone, remote control device, button, joystick, trackball, touchpad, lightpen, etc. Examples of different kinds of output devices 968 include a speaker, printer, etc. One specific type of output device that may be included in a computer system is a display device 972. Display devices 972 used with configurations disclosed herein may utilize any suitable image projection technology, such as liquid crystal display (LCD), light-emitting diode (LED), gas plasma, electroluminescence, a cathode ray tube (CRT) or the like.

A display controller 976 may also be provided, for converting data stored in the memory 962 into text, graphics and/or moving images (as appropriate) shown on the display device 972. Of course, FIG. 9 illustrates only one possible configuration of a computing device 958. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method, comprising:
    determining, at a first managed device from a plurality of managed devices in a network segment, an election score for the first managed device using a set of election rules associated with identifying a managed device from the plurality of managed devices to provide a service;
    sending, via the first managed device, a multicast message to a set of managed devices from the plurality of managed devices, such that a second managed device from the plurality of managed devices, in response to receiving the multicast message, determines an election score for the second managed device using the set of election rules and sends the election score for the second managed device to the first managed device;

receiving, at the first managed device, the election score for the second managed device;

comparing, at the first managed device, the election score for the first managed device with the election score for the second managed device; and in response to the election score for the first managed device being equal to the election score for the second managed device:

comparing, at the first managed device, a unique identifier of the first managed device with a unique identifier of the second managed device;

electing, at the first managed device and based on the comparing of the unique identifier of the first managed device with the unique identifier of the second managed device, to provide the service on the network segment; and configuring, at the first managed device, the first managed device with the service.

2. The method of claim 1, wherein the election score for the first managed device is based on a capability of the first managed device to provide the service relative to remaining managed devices from the plurality of managed devices.

3. The method of claim 1, wherein the multicast message is a first multicast message, and the
receiving the election score for the second managed device includes receiving, from the second managed device, a second multicast message including the election score for the second managed device.

4. The method of claim 1, further comprising, in response to the electing to provide the service:
sending, from the first managed device, a periodic message on a multicast channel to the set of managed devices, the periodic message indicating that the first managed device has elected to provide the service and including the election score of the first managed device such that each managed device from the set of managed devices, upon receiving the periodic message, does not provide the service.

5. The method of claim 1, further comprising, in response to the electing to provide the service:
receiving, in response to a third managed device joining the network segment, an inquiry message from the third managed device on a multicast channel, the inquiry message indicating that the third managed device can provide the service and inquiring whether a managed device from the plurality of managed devices in the network segment is providing the service; and
sending, from the first managed device and in response to the receiving the inquiry message, a response to the third managed device indicating that the first managed device is providing the service.

6. The method of claim 1, further comprising:
receiving, in response to a third managed device joining the network segment, a first message from the third managed device and including an election score for the third managed device determined based on the set of election rules;
comparing, at the first managed device, the election score for the first managed device with the election score for the third managed device;
when the election score for the third managed device is greater than a threshold amount from the election score for the first managed device, determining to not provide the service using the first managed device; and
when the election score for the third managed device is (i) greater than the election score for the first managed device and (ii) not greater than the threshold amount from the election score for the first managed device, sending a message to the third managed device indicating that the first managed device is providing the service.

7. The method of claim 1, further comprising, in response to the electing to provide the service:
receiving an inquiry message on a multicast channel from a third managed device, the inquiry message inquiring whether the service is being provided by a managed device from the plurality of managed devices in the network segment; and
sending, in response to the receiving, an inquiry response message on the multicast channel indicating that the first managed device has elected to provide the service, the inquiry response message including the election score for the first managed device.

8. The method of claim 1, further comprising:
validating, at the first managed device, a message received from the second managed device based on a cryptographic signature associated with the second managed device,
wherein:
the multicast message includes a cryptographic signature associated with the first managed device,
the sending the multicast message includes sending, from the first managed device and to the second managed device, the multicast message such that the second managed device, in response to receiving the multicast message, (1) validates the multicast message based on the cryptographic signature and (2) sends, in response to the validating, the message to the first managed device,
the receiving the election score for the second managed device includes receiving, from the second managed device, the message including the election score for the second managed device and the cryptographic signature associated with the second managed device, and
the comparing of the election score of the first managed device and the election score of the second managed device occurs in response to the validating of the message received from the second managed device.

9. The method of claim 1, further comprising, in response to the electing to provide the service:
reporting to an administration server that the first managed device has elected to provide the service;
receiving, at the first managed device, an instruction from the administration server indicating whether the first managed device should start the service; and
in response to the administration server indicating that the first managed device should start the service, providing, at the first managed device, the service.

10. The method of claim 1, further comprising:
sending, from the first managed device, a status report to an administration server indicating a status of the service.

11. An apparatus, comprising:
a processor of a first managed device configured to be included in a plurality of managed devices in a network segment, the processor configured to:
determine an election score for the first managed device using a set of election rules based on a type of a service, the election score for the first managed device indicating a capability of the first managed device to provide the type of the service relative to remaining managed devices from the plurality of managed devices;

send a first multicast message including the election score for the first managed device to a set of managed devices from the plurality of managed devices, such that each managed device from the set of managed devices, in response to receiving the first multicast message, (1) determines an election score for that managed device using the set of election rules, (2) compares the election score for the first managed device with the election score for that managed device, and (3) determines, based on the comparing of the election score for the first managed device and the election score for that managed device, to not provide the service on the network segment;

receiving, at the first managed device, a second multicast message from a second managed device from the plurality of network devices and including an election score for the second managed device;

in response to the receiving, compare the election score for the first managed device with the election score for the second managed device;

elect, based on the comparing of the election score for the first managed device with the election score for the second managed device, to provide the service on the network segment; and provision the first managed device with the service; and memory (1) in electronic communication with the processor and (2) storing the set of election rules.

12. The apparatus of claim 11, wherein the processor is further configured to, in response to the electing to provide the service:

send a periodic multicast message to the set of managed devices, the periodic multicast message indicating that the first managed device has elected to provide the service and including the election score of the first managed device such that each managed device from the set of managed devices, upon receiving the periodic multicast message, does not provide the service.

13. The apparatus of claim 11, wherein the processor is further configured to:

receive, in response to a third managed device joining the network segment, an inquiry message from the third managed device on a multicast channel, the inquiry message indicating that the third managed device can provide the service and inquiring whether a managed device other than the third managed device and in the network segment is providing the service; and send, in response to the receiving the inquiry message, a response to the third managed device indicating that the first managed device is providing the service.

14. The apparatus of claim 11, wherein the processor is further configured to:

receive, in response to a third managed device joining the network segment, a message from the third managed device and including an election score for the third managed device determined based on the set of election rules;

compare the election score for the first managed device with the election score for the third managed device;

when the election score for the third managed device is greater than a threshold amount from the election score for the first managed device, determining to not provide the service using the first managed device; and when the election score for the third managed device is (i) greater than the election score for the first managed device and (ii) not greater than the threshold amount from the election score for the first managed device, sending a message to the third managed device indicating that the first managed device is providing the service.

15. The apparatus of claim 11, wherein the processor is further configured to:

receive an inquiry message on a multicast channel from a third managed device, the inquiry message inquiring whether the service is being provided by a managed device in the network segment; and send, in response to the receiving the inquiry message, an inquiry response message on the multicast channel indicating that the first managed device has elected to provide the service, the inquiry response message including the election score for the first managed device.

16. The apparatus of claim 11, wherein the first multicast message includes a cryptographic signature associated with the first managed device so that each managed device from the set of managed devices, in response to receiving the first multicast message, can validate the first multicast message based on the cryptographic signature.

17. The apparatus of claim 11, wherein the processor is further configured to:

report to an administration server that the first managed device has elected to provide the service;

receive an instruction from the administration server indicating whether the first managed device should start the service; and in response to the administration server indicating that the first managed device should start the service, provide the service.

18. The apparatus of claim 11, wherein the processor is further configured to send a status report to an administration server indicating a status of the service.

19. An apparatus, comprising:

a memory storing a set of election rules associated with a service; and a processor of a first managed device and operatively coupled to the memory, the processor configured to:

determine an election score for the first managed device on a network segment using the set of election rules;

detect that a periodic message indicating that a second managed device has elected to provide the service on the network segment has not been received from the second managed device for an amount of time greater than a predefined amount of time, the first managed device and the second managed device belonging to a plurality of managed devices in the network segment;

in response to the detecting, send a multicast message including the election score for the first managed device to a set of managed devices from the plurality of managed devices and not including the second managed device, such that each managed device from the set of managed devices, in response to receiving the multicast message, determines (1) an election score for that managed device using the set of election rules and (2) whether to send a message to the first managed device indicating that the election score for that managed device is greater than the election score for the first managed device;

in response to not receiving a message from the set of managed devices within a predefined period of time:

elect to provide the service on the network segment; and send a set of periodic messages indicating that the first managed device has elected to provide the service and including the election score for the first managed device, each periodic message from the set of periodic messages sent a predefined period of time after another periodic message from the set of periodic messages; and in response to receiving a message from a third managed device from the set of managed devices within the predefined period of time and including an election score for the third managed device:

compare the election score for the first managed device with the election score for the third managed device; and determine, based on the comparing, to not provide the service using the first managed device.

20. The apparatus of claim 19, wherein the processor is further configured to:

receive, after the detecting that the periodic message has not been received, a message from the second managed device and including an election score for the second managed device;

compare the election score for the first managed device with the election score for the second managed device;

when the election score for the second managed device is greater than a threshold amount from the election score for the first managed device, determining to not provide the service using the first managed device; and when the election score for the second managed device is (i) greater than the election score for the first managed device and (ii) not greater than the threshold amount from the election score for the first managed device, sending a message to the second managed device indicating that the first managed device has elected to provide the service.

21. The apparatus of claim 19, wherein the election score for the first managed device indicates a capability of the first managed device to provide the service relative to remaining managed devices from the plurality of managed devices.

22. The apparatus of claim 19, wherein the set of election rules is a first set of election rules, and the service is a first service, the memory storing a second set of election rules associated with a second service and different from the first set of election rules.

23. The apparatus of claim 19, wherein the processor is further configured to:

receive, after the detecting that the periodic message has not been received, a first message from the second managed device including an election score for the second managed device;

compare the election score for the first managed device with the election score for the second managed device;

in response to the election score for the first managed device being equal to the election score for the second managed device:

compare a unique identifier of the first managed device with a unique identifier of the second managed device; and elect, at the first managed device and based on the comparing of the unique identifier of the first managed device with the unique identifier of the second managed device, to provide the service on the network segment.

* * * * *